US011927033B2

(12) United States Patent
Ng et al.

(10) Patent No.: US 11,927,033 B2
(45) Date of Patent: Mar. 12, 2024

(54) PADLOCK WITH REMOVABLE OR INTERCHANGEABLE SHACKLE

(71) Applicant: IGLOOCOMPANY PTE. LTD., Singapore (SG)

(72) Inventors: Matthew Manthik Ng, Singapore (SG); Khee Kien Ho, Singapore (SG); Julius Chee Kin Pang, Singapore (SG); Chun Chiang Eric Chan, Singapore (SG)

(73) Assignee: IGLOOCOMPANY PTE. LTD., Singapore (SG)

( * ) Notice: Subject to any disclaimer, the term of this patent is extended or adjusted under 35 U.S.C. 154(b) by 402 days.

(21) Appl. No.: 17/285,937

(22) PCT Filed: Oct. 21, 2019

(86) PCT No.: PCT/SG2019/050521

§ 371 (c)(1),
(2) Date: Apr. 16, 2021

(87) PCT Pub. No.: WO2020/081015

PCT Pub. Date: Apr. 23, 2020

(65) Prior Publication Data

US 2021/0324662 A1 Oct. 21, 2021

(30) Foreign Application Priority Data

Oct. 19, 2018 (SG) ............................ 10201809288T

(51) Int. Cl.

*E05B 67/06* (2006.01)
*E05B 67/02* (2006.01)
*E05B 67/22* (2006.01)

(52) U.S. Cl.

CPC ............ *E05B 67/063* (2013.01); *E05B 67/02* (2013.01); *E05B 67/22* (2013.01)

(58) Field of Classification Search

CPC ........ E05B 67/00; E05B 67/06; E05B 67/063; E05B 67/02; E05B 67/22; E05B 67/24; E05B 67/28; E05B 2067/066

(Continued)

(56) References Cited

U.S. PATENT DOCUMENTS 8,904,833 B1 12/2014 Liu
9,428,941 B1 * 8/2016 Yang ..................... E05B 67/063

(Continued)

FOREIGN PATENT DOCUMENTS

KR 1019940004880 A 3/1994

OTHER PUBLICATIONS

International Search Report and Written Opinion of International Searching Authority for International Application No. PCT/SG2019/050521.

(Continued)

*Primary Examiner* — Nathan Cumar

(74) *Attorney, Agent, or Firm* — JCIP; Joseph G. Chu; Jeremy I. Maynard

(57) ABSTRACT

A padlock having a removable or interchangeable shackle is disclosed. The padlock comprises a lock body and a shackle, the shackle being movable in an axial direction between a locked position and an unlocked position, the short leg being withdrawn from the lock body in the unlocked position. The padlock also comprises a retaining shaft receivable within a corresponding bore of the lock body, wherein the long leg includes a longitudinal recess for providing a travel path for the movement of the shackle from a locked position defined by the retaining shaft engaging a first end of the longitudinal recess to an unlocked position defined by the retaining shaft engaging a second end of the longitudinal recess to prevent the shackle from being removed from the lock body when the shackle is in the unlocked position.

15 Claims, 10 Drawing Sheets

(58) Field of Classification Search
USPC .......................................................... 70/38 R
See application file for complete search history.

(56) References Cited

U.S. PATENT DOCUMENTS

| | | | | |
|---|---|---|---|---|
| 2013/0276487 A1* | 10/2013 | Burmesch | ............... | E05B 67/24<br>29/434 |
| 2014/0191638 A1* | 7/2014 | Nakao | ..................... | H04M 1/18<br>312/229 |

OTHER PUBLICATIONS

International Patent Report on Patentability (Chapter II) for International Application No. PCT/SG2019/050521.

* cited by examiner

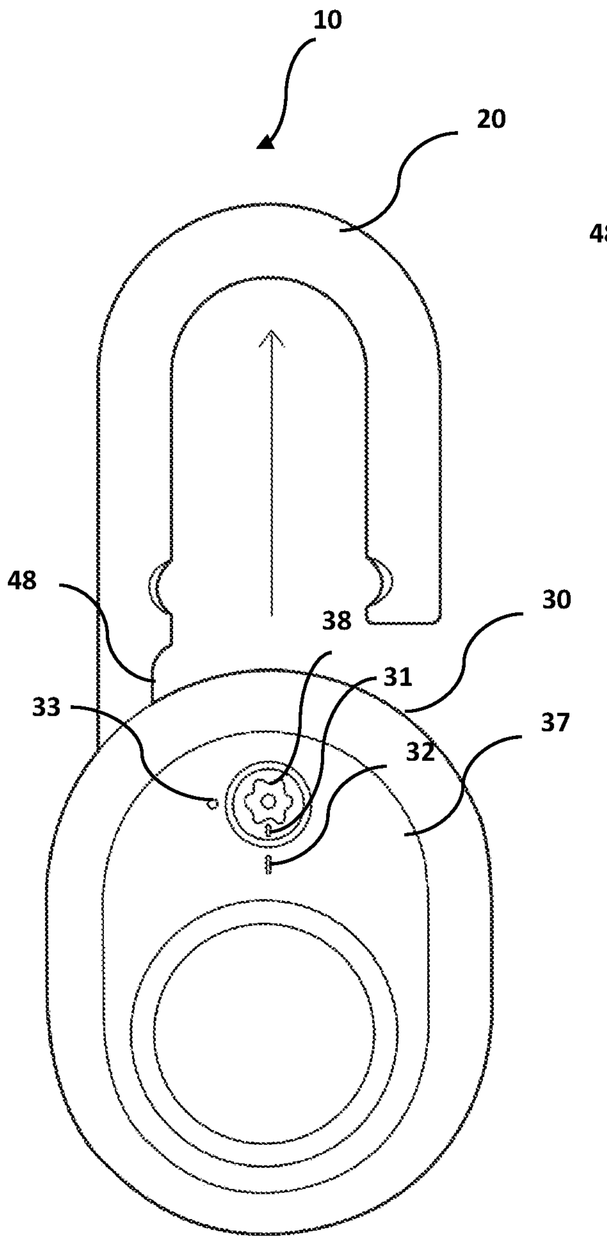
Fig. 7a
Fig. 7b
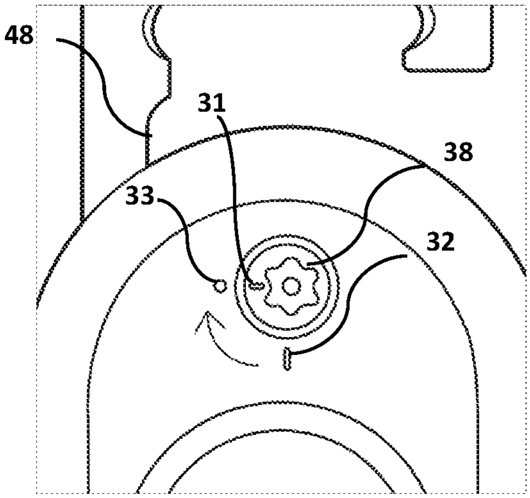
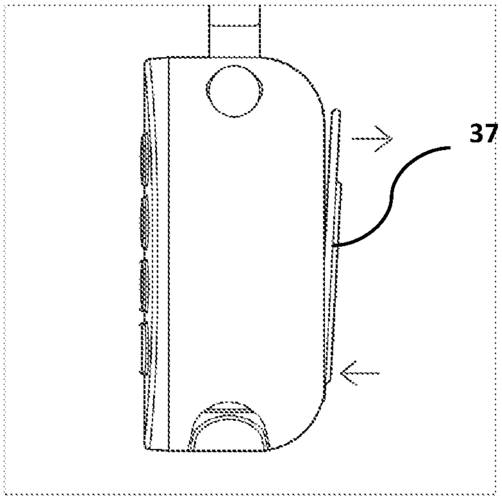
Fig. 7c

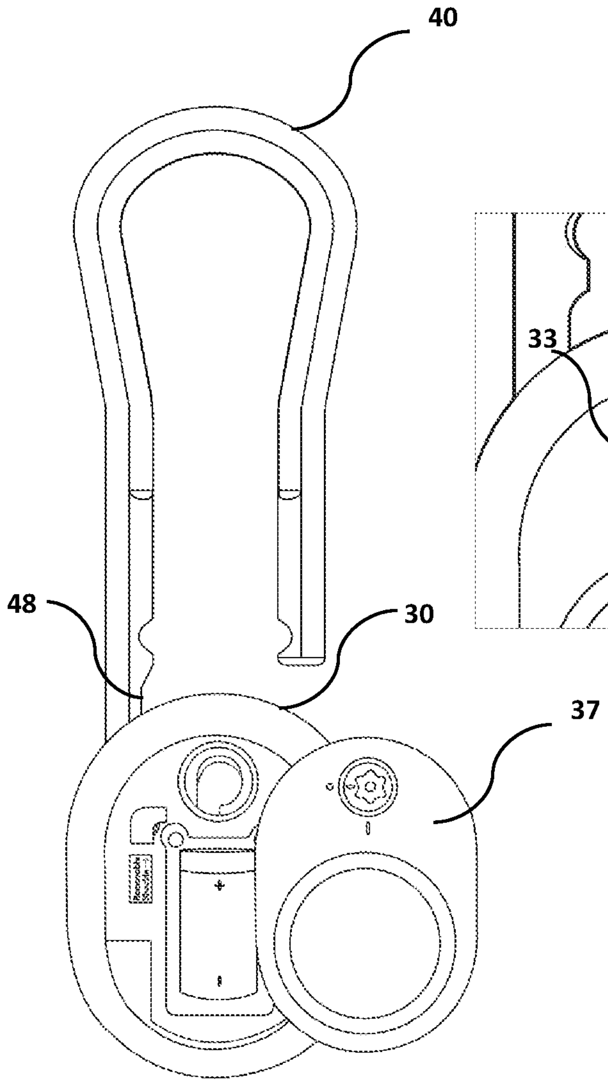
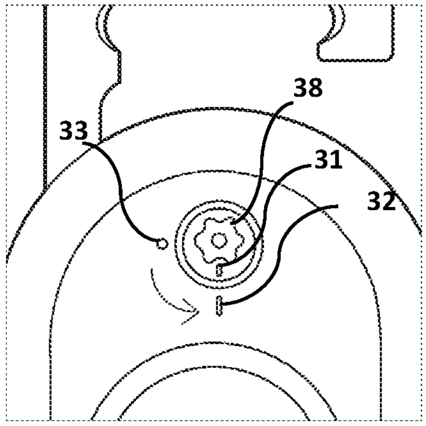
Fig. 10b
Fig. 10a

PADLOCK WITH REMOVABLE OR INTERCHANGEABLE SHACKLE

TECHNICAL FIELD

The present disclosure relates generally to a padlock. More particularly, the present disclosure relates to a padlock with a removable or interchangeable shackle.

BACKGROUND

The following discussion of the background to the invention is intended to facilitate an understanding of the present invention. However, it should be appreciated that the discussion is not an acknowledgment or admission that any of the material referred to was published, known or part of the common general knowledge in any jurisdiction as at the priority date of the application.

A padlock typically has a shackle function that either retains or separates off from the lock body when unlocked. A typical padlock uses a U-shape shackle which can be opened and locked to secure a large variety of different objects, such as doors, gates, and other structures. Shackle openings on doors and other like structures are dimensioned to allow the shackle of a padlock to fit through the shackle opening. Shackle openings on doors and like structures have a wide variety of dimensions to accommodate padlocks of a variety of sizes, while a larger padlock has to be used to fit a wider shackle opening. As a result, one padlock suited for one shackle opening may be ill-suited for another, and a consumer has to purchase a different padlock for each shackle opening. It is desirable to have a padlock in a small form factor that could fit in the user's hands to maximize ergonomics and comfort. However, such small form factor padlocks using the traditional U-shaped shackles will not fit doors with wider shackle openings.

The present invention attempts to address or to overcome at least some of the aforementioned problems. Conventionally, various sizes of padlocks are sold to accommodate like sizes of shackle openings. It is therefore desirable to have a small form factor padlock to fit a wider variety of shackle opening lengths, and that increases marketability of the product.

SUMMARY OF THE INVENTION

Throughout this document, unless otherwise indicated to the contrary, the terms "comprising", "consisting of", and the like, are to be construed as non-exhaustive, or in other words, as meaning "including, but not limited to".

In accordance with a first aspect of the invention, there is provided a padlock comprising a lock body, a shackle having a long leg and a short leg receivable in corresponding first and second shackle recesses in the lock body, the shackle being movable in an axial direction between a locked position and an unlocked position, the short leg being withdrawn from the lock body in the unlocked position, a retaining shaft receivable within a corresponding bore of the lock body, wherein the long leg includes a longitudinal recess for providing a travel path for the movement of the shackle from a locked position defined by the retaining shaft engaging a first end of the longitudinal recess to an unlocked position defined by the retaining shaft engaging a second end of the longitudinal recess to prevent the shackle from being removed from the lock body when the shackle is in the unlocked position.

Preferably, the retaining shaft is removable from the corresponding bore of the lock body for detaching the shackle from the lock body.

Preferably, the longitudinal recess includes a flat portion for movement of the shackle from the locked position to the unlocked position, and for engaging the retaining shaft on the flat portion.

Preferably, the retaining shaft includes an elongated body and a top cover at one end of the elongated body.

Preferably, the retaining shaft is receivable within the bore of the lock body in a transverse direction to the longitudinal axis of the lock body.

Preferably, the lock body further comprises a rear cover for replacing a battery, and the cover further including a torx cap for removing the rear cover from the lock body.

Preferably, the cap includes a projection for engagement with an elongated device for receiving the projection, wherein when the elongated device is engaged with the projection, a rotation of the elongated device in a predetermined direction and predetermined amount of rotation allows the rear cover to be capable of being removed from the lock body.

Preferably, a rotation of the cap in a predetermined direction and predetermined amount of rotation allows the rear cover to removed from the lock body.

Preferably, a force applied on a lower portion of the rear cover causes the top portion of the rear cover to be unhinged from the lock body thereby facilitating the removal of the rear cover from the lock body.

Preferably, the predetermined amount of rotation is ninety degrees.

Preferably, the cap includes a guide indicator that aligns with a corresponding close indicator on the rear cover when the rear cover is secured to the lock body.

Preferably, the cap includes a guide indicator that aligns with a corresponding open indicator on the rear cover when the rear cover is in a position to be removed from the lock body. Lining up the indicator on the screw cover at 9 o'clock position is in open position (when cover is then removable), and 6 o'clock is in closed position (when cover cannot be removed)

Preferably, the shackle is generally U-shaped.

Preferably, the shackle includes a first portion having a uniform width between the long and short legs and a second portion having an increasing width between the long and short legs.

Preferably, the second portion is positioned further from the lock body.

Preferably, the height of the first and second portions is dimensioned to fit a corresponding shackle opening of a suitable width.

Preferably, the retaining shaft is accessible only when the rear cover is removed from the lock body.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The dimensions of the various features or elements may be arbitrarily expanded or reduced for clarity. In the following description, various embodiments of the invention are described with reference to the following drawings, in which:

FIG. 7*a* illustrates a rear view of a padlock in the process of being unlocked according to various embodiments;

FIG. 7*b* illustrates a rear view of a padlock and a first step in how a lock body cover is in the process of being removed according to various embodiments;

FIG. 7*c* illustrates a side view of a padlock and a second step in how a lock body cover is in the process of being removed according to various embodiments;

FIG. 10*a* illustrates a rear view of the padlock and the replacement of a different shackle in an unlocked position according to various embodiments; and FIG. 10*b* illustrates a rear view of the padlock and the closing of the lock body cover according to various embodiments.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

Indeed, the invention as claimed may be broader than and unlimited by way of the exemplary embodiments, and the terms used in the claims have their full ordinary meaning. For example, while the specific embodiments described herein relate to electromechanical padlocks, the features of the present application may additionally or alternatively be applied to other types of padlocks, for example, combination padlocks, electromechanically operated padlocks, smart or intelligent padlocks, alphanumerical combination electronic padlocks, and other types of portable locks, including, cable locks, pin locks, etc.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The term "coupled" (or "connected") herein may be understood as electrically coupled or as mechanically coupled, for example attached or fixed, or just in contact without any fixation, and it will be understood that both direct coupling or indirect coupling (in other words: coupling without direct contact) may be provided.

Figure 1A:
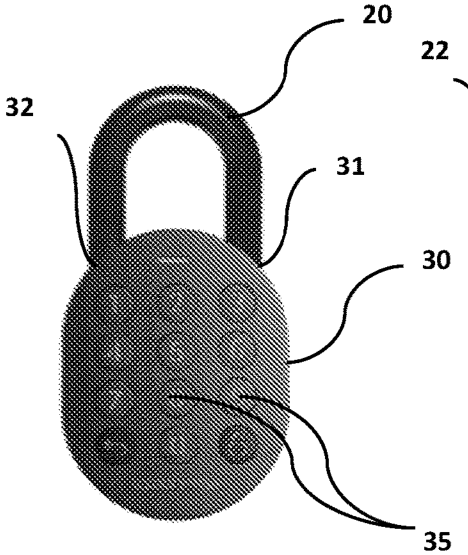
FIGS. 1*a* to 1*c* illustrate front views of a padlock in various stages of removing a removable or interchangeable shackle according to various embodiments.
Figure 1B:
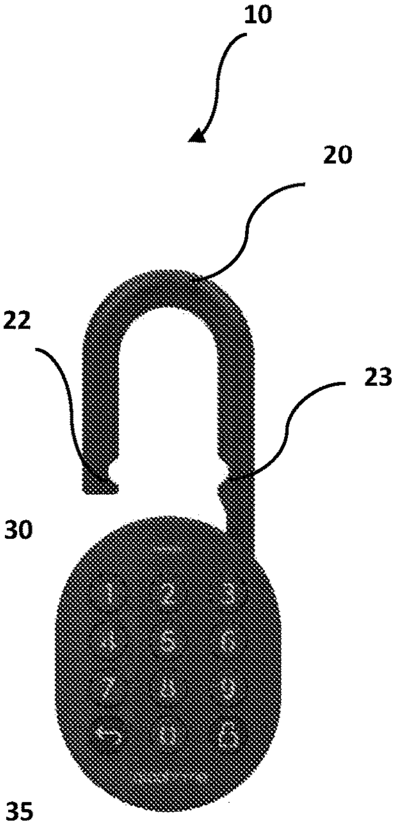
Figure 1C:
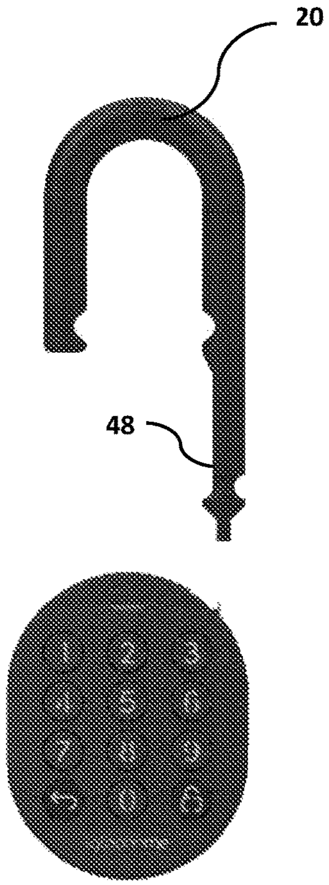

FIGS. 1*a* to 1*c* illustrate a front view of an exemplary combination padlock 10 which may be provided with a mechanical numerical keypad interface 35 or physical buttons 35 having a series of sequential numbers for a user to physically depress. In one embodiment, one or more numerical indicia (such as sequential numbers) may be provided on the stationary face of the padlock, and each numerical indicia is represented by a mechanical keypad or a physical button 35 for a user to depress. The combination padlock 10 includes a lock body 30 with a first and second shackle recesses 31, 32 extending from an upper end of the lock body 30. The shackle 20 has a first and second leg, one of which is longer than the other. The shackle recesses 31, 32 receive the first and second legs of a generally U-shaped shackle 20. The mechanical keypad 35 allows a user to depress a passcode indicated by a series of pre-set numbers to operate a locking mechanism, to allow axial movement of a shackle 20 from a retracted position to an extended position, such that the short leg of the shackle may be disengaged or withdrawn from a lock body to open the padlock.

The exemplary combination padlock 10 includes a lock body 30. The lock body 30 includes a locking mechanism (not shown), or any other suitable locking mechanism as known in the art. In one embodiment, the locking mechanism comprises a first locking element and a second locking element (not shown). In one embodiment, the first and second locking elements are ball bearings which are both in contact with an actuator within the locking mechanism. For example, an actuator may be a cam. The actuator further includes at least two recesses that correspond to the first and second locking elements and is rotatable within the lock body such that rotation of the actuation causes movement of the shackle between a locked position and an unlocked position, or in a retracted position and extended position. When the actuator is in a locked position, each of the locking elements is in interlocking engagement with a corresponding recess in the long leg and short leg of the shackle to prevent withdrawal of the shackle to the unlocked position. When a user successfully keys in a correct passcode through the mechanical keypad or uses smartphone to unlock via Bluetooth communication, the actuator is caused to rotate to the unlocked position, such that the recesses of the actuator allows the first and second locking elements to disengage from the corresponding recesses in the long leg and short leg of the shackle and to bias the first and second locking elements to the recesses of the actuator. This allows the shackle to be withdrawn to the unlocked or extended position. It is envisaged that many different locking mechanisms or configurations may be used for selective engagement and disengagement of the locking elements with the interlocking actuator. Further details of a longitudinal recess 48 will be explained hereinafter.

Figures 2A, 2B, 2C:
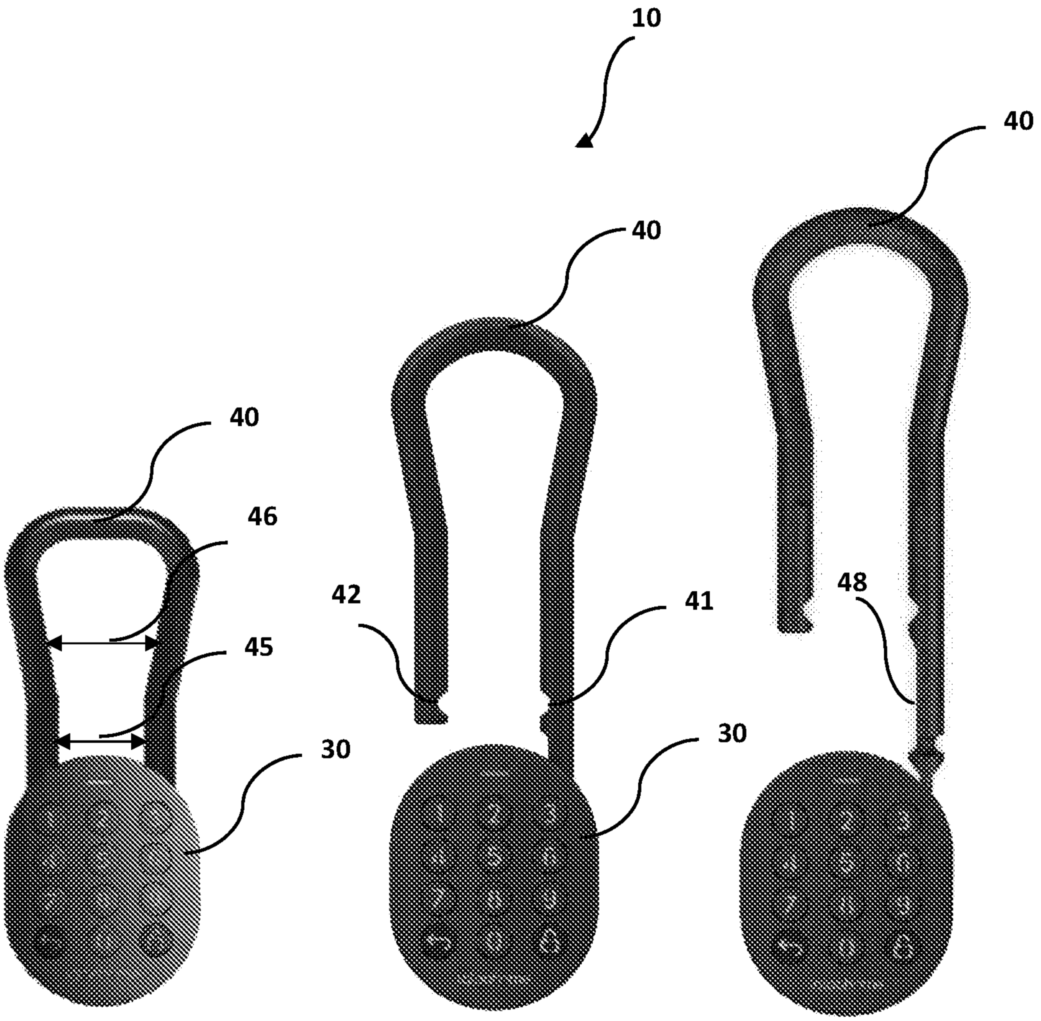
FIGS. 2*a* to 2*c* illustrate front views a padlock in various stages of removing a wider removable shackle having an increased internal height and an increased width at the top of the shackle according to various embodiments.

FIGS. 2*a* to 2*c* illustrates the front views of a padlock 10 having the same lock body 20 but a different removable shackle 40. The shackle 40 has first and second legs, where one leg is shorter than the other. The first leg and second leg also include a corresponding recess 41, 42 for interlocking engagement with the first and second locking elements of the locking mechanism (not shown). Instead of a generally U-shaped shackle, the shackle includes a first portion 45 with both the first and second legs having a uniform width and a second portion 46 with the first and second legs having an increasing width from each other away from the lock body. In one embodiment, the second portion 46 ends with an elongated portion connected to the first and second legs. In another embodiment, the shackle has an increased internal height and has a shape that has an increased internal width at the top that is able to cover use cases like require more space in the shackle like wider shackle openings. The internal width at the bottom of the shackle is maintained so it can be installed back to the padlock body. Each of the embodiments allows the padlock that enables the shackle to be removed and interchanged with a different shackle shapes and sizes, such as those in FIGS. 1*a* to 1*c*.

Figure 3A:
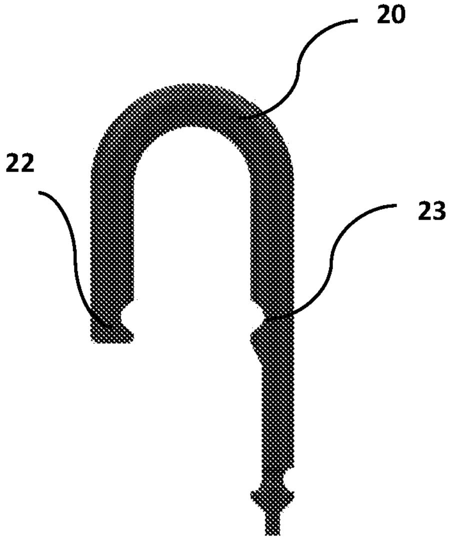
FIG. 3*a* illustrates a U-shaped shackle according to various embodiments.
Figure 3B:
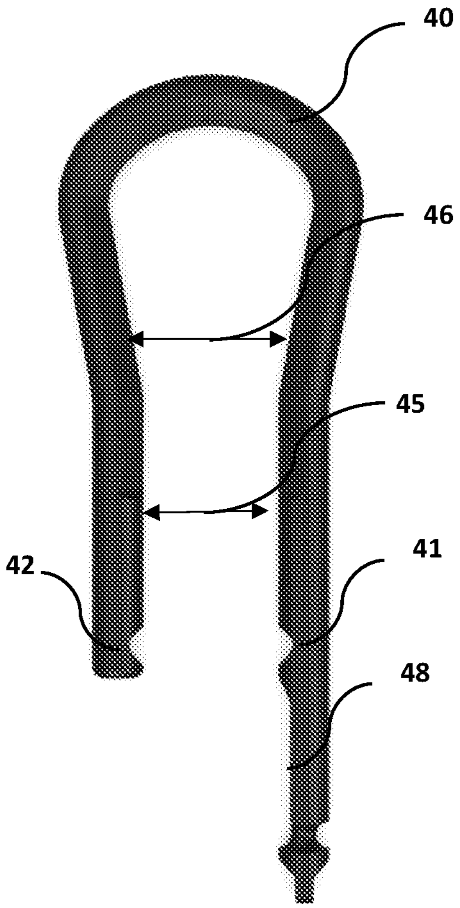
FIG. 3*b* illustrates a shackle having an increased internal height and an increased internal width at the top of the shackle according to various embodiments.

FIG. 3*a* illustrates a U-shaped shackle while FIG. 3*b* illustrates a shackle having an increased internal height and an increased internal width at the top of the shackle. FIG. 3*b* also illustrates a first portion 45 with both the first and second legs having a uniform width and a second portion 46 with the first and second legs having an increasing width from each other away from the lock body. In an embodiment, FIG. 3*b* shows a shackle that is widened at its width, but the increased widened width at the top of the shackle may come in different various shapes and forms to fit the purpose. As will be explained in further details hereinafter, the mechanism to remove the shackle is hidden below the rear cover 37 and the battery 36 can only be removed when the padlock 10 is unlocked. Once the blocker or the retaining shaft 25 is removed, the shackle is able to release fully from the shackle and another shackle can be inserted into the padlock. The blocker or retaining shaft 25 can be inserted back to the padlock 10 to retain the shackle or the user can leave the screw out so the padlock can be removable instead of being retained. This mechanism allows the user to remove the shackle conveniently, and yet obscures how the shackle could be removed.

Figure 4A:
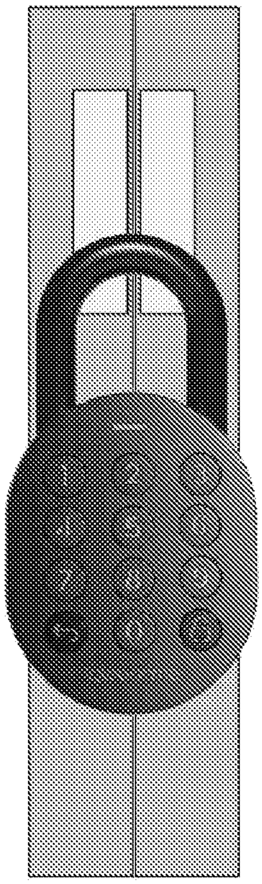
FIG. 4*a* illustrates how a traditional U-shaped shackle does not fit a shackle opening according to various embodiments.
Figure 4B:
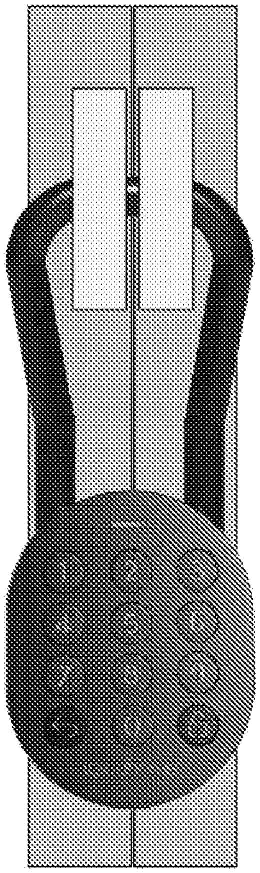
FIG. 4*b* illustrates how a shackle with an increased height and width at the top of the shackle fits a shackle opening according to various embodiments.
Figure 5A:
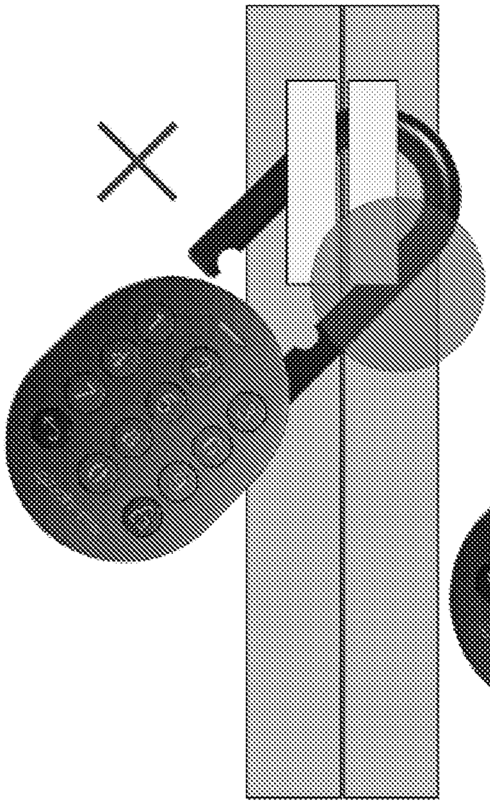
FIG. 5*a* illustrates how a traditional U-shaped shackle does not fit a shackle opening according to various embodiments.
Figure 5B:
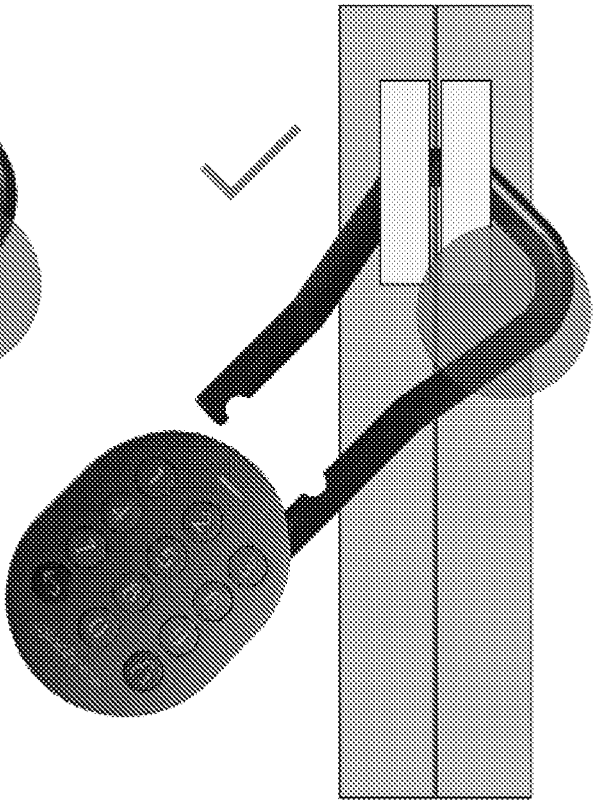
FIG. 5*b* illustrates how a shackle with an increased height and width at the top of the shackle fits a shackle opening according to various embodiments.

FIG. 4*a* illustrates how a traditional U-shaped shackle does not fit a shackle opening. FIG. 4*b* illustrates how a shackle with an increased height and width at the top of the shackle fits a shackle opening. Similar to FIGS. 4*a* and 4*b*, FIG. 5*a* illustrates how a traditional U-shaped shackle does not fit a shackle opening while FIG. 5*b* illustrates how a shackle with an increased height and width at the top of the shackle fits a shackle opening.

Figure 6:
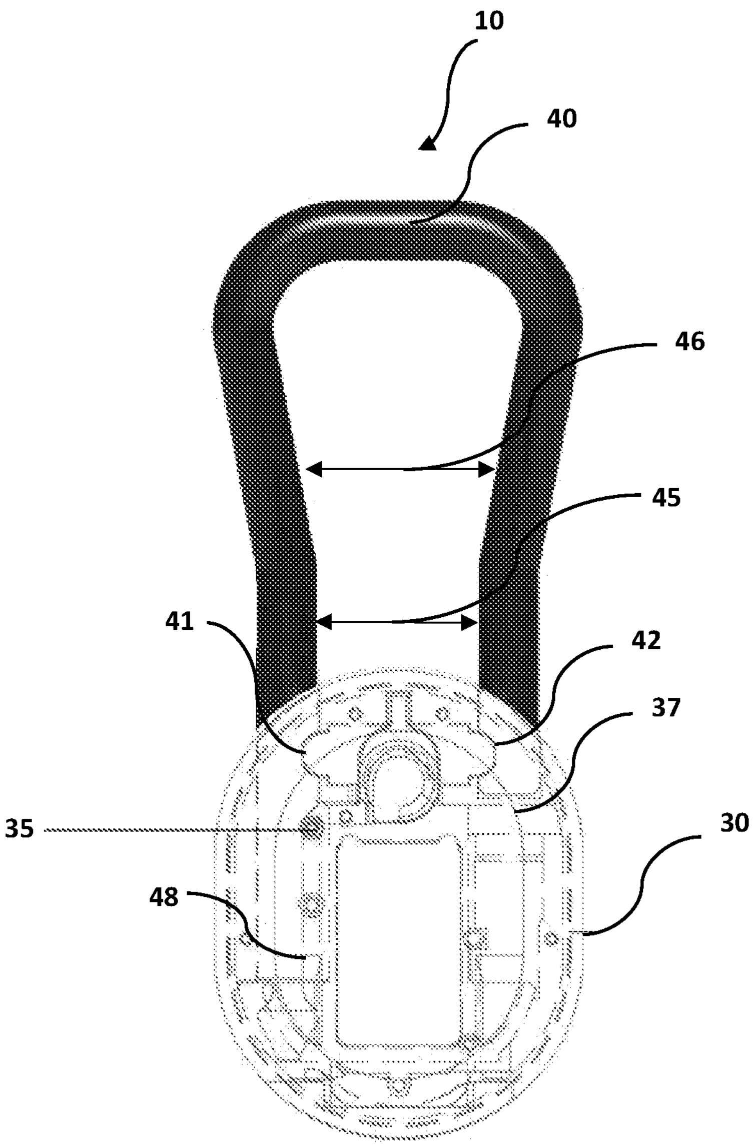
FIG. 6 is a cross sectional view of an embodiment of a padlock with removable shackle according to various embodiments.

FIG. 6 illustrates a cross sectional rear view of a padlock with a removable shackle 40. The shackle 40 has a first and second legs, where the first leg is shorter than the second leg. The first and second legs also include a corresponding recess 41, 42 for interlocking engagement with the first and second locking elements of the locking mechanism (not shown). The shackle also includes a first portion 45 with both the first and second legs having a uniform width and a second portion 46 with the first and second legs having an increasing width from each other away from the lock body 30. In one embodiment, the second portion 46 ends with an elongated portion connected to the first and second legs. In one embodiment, the longer leg of the shackle 40 further comprises a cutoff portion or a longitudinal recess 48 at the end portion of the leg. When the shackle is in the locked position, the cutoff portion or the longitudinal recess is not visible to the eye and is located within the cavity of the lock body 30. The cutoff portion or longitudinal recess 48 includes a substantially flat portion with rounded curvatures at each end of the cutoff portion or longitudinal recess 48. The lock body 30 includes an opening 39 (shown in FIG. 9) for receiving a retaining shaft 25, where the opening is substantially perpendicular to a longitudinal axis of the lock body, or substantially parallel to a transverse axis of the lock body. In one embodiment, the retaining shaft 25 includes an elongated body having a cap. When the retaining shaft 25 is received by the opening in a locked position, it engages with the flat portion of the longitudinal recess 48 at one end. Further details of the engagement between the retaining shaft 25 and the longitudinal recess 48 will be explained hereinafter.

The rear portion of the padlock 10 includes a rear cover 37 which allows a user to change the battery when it is depleted. FIGS. 7*a* to 7*c* illustrates rear views of the padlock 10 in the process of being unlocked. In order to remove the rear cover 37, a user will first have to unlock the padlock 10 such that the shackle 20 is in an extended position or unlocked position as shown in FIG. 7*a*. Once the shackle 20 is in an unlocked position, a cap 38 that prevents the rear cover 37 from being removed when the shackle is in the locked position can be manipulated by a user to detach the rear cover 37 from the lock body 30. In other words, the rear cover 37 cannot be removed unless the shackle 20 is in the unlocked position. In one embodiment, the cap 38 is a torx cap that can only be manipulated by a torx screwdriver (not shown) by turning the torx cap clockwise by ninety degrees as shown in FIG. 7*b*. If the shackle 20 is in a locked position, the torx screwdriver cannot be used on the cap 37 as it does not allow the user to turn the torx cap clockwise. Once the torx cap is rotated clockwise by ninety degrees to an open position, a user can then apply force or pressure on the bottom half of the rear cover 37 which will enable the top half of the rear cover 37 to detach from the lock body 30, allowing the user to manually remove the rear cover 37 as shown in FIG. 7*c*. In one embodiment, the torx cap includes a guide indicator 31 that aligns with corresponding close 32 and open indicators 31 on the rear cover 37 to indicate to the user the direction and amount of rotation of the cap 38 in order to align the guide indicator 31 on the cap from the close indicator 32 to the open indicator 31 on the rear cover 37.

Figure 8:
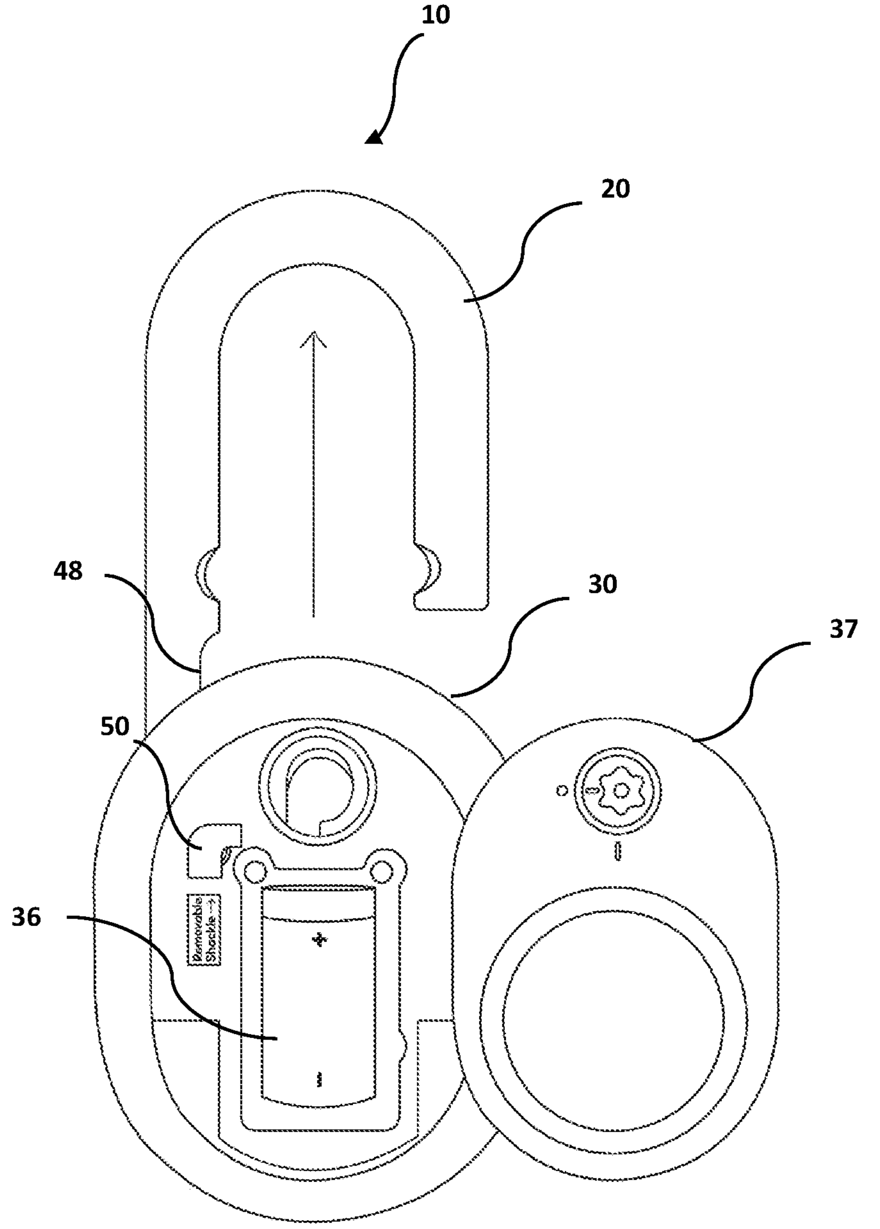
FIG. 8 illustrates a rear view of a padlock and the internal components of the lock body when the lock body cover is removed from the padlock according to various embodiments.

FIG. 8 illustrates the internal components of the lock body 30 when the rear cover 37 is removed from the padlock 10. If the battery 36 requires replacement, a user can remove the battery 36 and replace it with a new battery. If the user requires to remove the shackle 20, the user will have to remove a sticker 50 covering the retaining shaft 25. Once the sticker 50 is removed, a user uses any elongated or sharp object to remove the retaining shaft 25 from the opening 39 of the lock body 30. As mentioned earlier, when the retaining shaft 25 is received by the opening 39 when the shackle 20 is in a locked position, it engages with the flat portion of the longitudinal recess 48 at a first end closer to the midportion of the long leg of the shackle 20. When the shackle 20 is in an unlocked position, the second end of the longitudinal recess 48, closer to the end portion of the long leg, engages with the retaining shaft 25 to prevent the removal of the shackle 20 from the lock body 30. In other words, the curvature at the end portion of the longitudinal recess 48 provides a retaining wall to prevent the shackle 20 from being detached from the lock body. The longitudinal recess 48 also provides a travel path for the shackle 20 to move from a locked position to an unlocked position. While the retaining shaft 25 remains stationary as the shackle moves from a locked position to an unlocked position, the surface of the elongated body of the retaining shaft 25 engages the flat portion of the longitudinal recess 48 as it moves from a first upper end portion of the shackle 20 (in a locked position) to a second lower end portion of the shackle (in an unlocked position). When the retaining shaft 25 is removed from the opening 39, the retaining shaft 25 no longer retains the shackle 20 within the lock body, and the shackle 20 can be detached or separated from the lock body 30.

Figure 9:
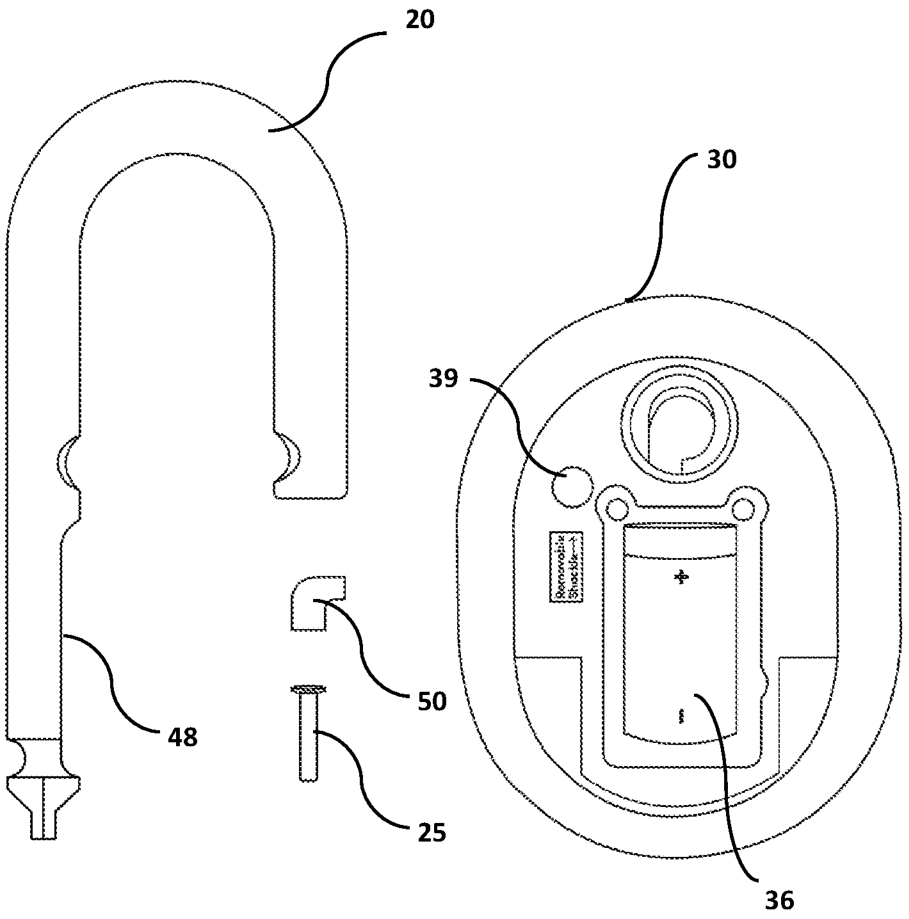
FIG. 9 illustrates the shackle, retaining shaft and a rear view of the lock body separated from one another according to various embodiments.

FIG. 9 illustrates the shackle 20, retaining shaft 25 and the lock body 30 separated from one another. The retaining shaft 25 includes an elongated body having a top cover. The top cover allows a user to use a long or sharp object to catch on the top cover and to pull out the retaining shaft 25 from the opening 39. Additionally, although the opening 39 and the retaining shaft 25 is visible when the rear cover is removed, an unauthorized user would not know how to remove the retaining shaft 25 from the opening as the retaining shaft 25 looks like a screw holding the lock body 30 together.

FIG. 10*a* illustrates the replacement of another shackle 40 with the lock body 30. Once the first shackle 20 is removed from the lock body 30, a second shackle 40 that is suitably sized to fit the shackle opening can be inserted into the lock body recesses. The second shackle 40 should be in an unlocked position when the long leg of the shackle is inserted into the corresponding recess of the lock body 30. If the second shackle is not in the unlocked position, the user will not be able to secure the rear cover 37 to the rear of the lock body 30. When the second shackle is the unlocked position, the rear cover is placed on the lock body 30 to cover its internal components and a screwdriver is used to manually rotate anticlockwise by ninety degrees (or in an opposed direction for removing the rear cover from the lock body) the cap 38 of the rear cover 37. By doing so, this aligns the guide indicator of the cap from the open indicator 33 to the closed indicator 32. The rear cover 37 is secured to the lock body 30 when the guide indicator 31 of the cap is aligned with the closed indicator 32 as shown in FIG. 10*b*. In one embodiment, the cap is designed such that it can be manually rotated by a torx screwdriver. Once the rear cover 37 is secured to the lock body 30, the shackle 40 can then be locked accordingly.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A padlock comprising:

a lock body;

a shackle having a long leg and a short leg receivable in corresponding first and second shackle recesses in the lock body, the shackle being movable in an axial direction between a locked position and an unlocked position, the short leg being withdrawn from the lock body in the unlocked position;

a retaining shaft receivable within a corresponding bore of the lock body, wherein the long leg includes a longitudinal recess for providing a travel path for the movement of the shackle from a locked position defined by the retaining shaft engaging a first end of the longitudinal recess to an unlocked position defined by the retaining shaft engaging a second end of the longitudinal recess to prevent the shackle from being removed from the lock body when the shackle is in the unlocked position;

wherein the lock body further comprises a rear cover for replacing a battery, and the cover further including a torx cap, wherein the torx cap includes a projection for engagement with an elongated device for receiving the projection, wherein when the lock body is in the unlocked position, and when the elongated device is engaged with the projection, a rotation of the elongated device in a predetermined direction and predetermined amount of rotation allows the rear cover to be capable of being removed from the lock body.

2. The padlock according to claim 1, wherein the retaining shaft is removable from the corresponding bore of the lock body for detaching the shackle from the lock body.

3. The padlock according to claim 1, wherein the longitudinal recess includes a flat portion for movement of the shackle from the locked position to the unlocked position, and for engaging the retaining shaft on the flat portion.

4. The padlock according to claim 1, wherein the retaining shaft includes an elongated body and a top cover at one end of the elongated body.

5. The padlock according to claim 1, wherein the retaining shaft is receivable within the bore of the lock body in a transverse direction to the longitudinal axis of the lock body.

6. The padlock according to claim 1, wherein a rotation of the cap in a predetermined direction and predetermined amount of rotation allows the rear cover to be removed from the lock body.

7. The padlock according to claim 6, wherein a force applied on a lower portion of the rear cover causes the top portion of the rear cover to be unhinged from the lock body thereby facilitating the removal of the rear cover from the lock body.

8. The padlock according to claim 6, wherein the predetermined amount of rotation is ninety degrees.

9. The padlock according to claim 1, wherein the cap includes a guide indicator that aligns with a corresponding close indicator on the rear cover when the rear cover is secured to the lock body.

10. The padlock according to claim 1, wherein the cap includes a guide indicator that aligns with a corresponding open indicator on the rear cover when the rear cover is in a position to be removed from the lock body.

11. The padlock according to claim 1, wherein the shackle is generally U-shaped.

12. The padlock according to claim 1, wherein the shackle includes a first portion having a uniform width between the long and short legs and a second portion having an increasing width between the long and short legs.

13. The padlock according to claim 12, wherein the second portion is positioned further from the lock body.

14. The padlock according to claim 12, wherein the height of the first and second portions is dimensioned to fit a corresponding shackle opening of a suitable width.

15. The padlock according to claim 1, wherein the retaining shaft is accessible only when the rear cover is removed from the lock body.

* * * * *